US010133000B2

(12) United States Patent
Sanghera et al.

(10) Patent No.: US 10,133,000 B2
(45) Date of Patent: Nov. 20, 2018

(54) TAILORED INTERFACES BETWEEN OPTICAL MATERIALS

(71) Applicants: Jasbinder S. Sanghera, Ashburn, VA (US); Catalin M Florea, Washington, DC (US); Leslie Brandon Shaw, Woodbridge, VA (US); Lynda E Busse, Alexandria, VA (US); Ishwar D. Aggarwal, Charlotte, NC (US); Steven R. Bowman, Edgewater, MD (US)

(72) Inventors: Jasbinder S. Sanghera, Ashburn, VA (US); Catalin M Florea, Washington, DC (US); Leslie Brandon Shaw, Woodbridge, VA (US); Lynda E Busse, Alexandria, VA (US); Ishwar D. Aggarwal, Charlotte, NC (US); Steven R. Bowman, Edgewater, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 1234 days.

(21) Appl. No.: 13/629,648

(22) Filed: Sep. 28, 2012

(65) Prior Publication Data
US 2013/0083402 A1    Apr. 4, 2013

Related U.S. Application Data

(60) Provisional application No. 61/541,180, filed on Sep. 30, 2011.

(51) Int. Cl.
*G02B 6/25* (2006.01)
*G02B 1/118* (2015.01)
(Continued)

(52) U.S. Cl.
CPC ............ *G02B 6/25* (2013.01); *G02B 1/118* (2013.01); *G02B 6/255* (2013.01); *G02B 6/32* (2013.01);
(Continued)

(58) Field of Classification Search
CPC .......... G02B 1/118; G02B 6/24–6/268; G02B 6/38–6/3898; G02B 6/02309; G02B 6/003–6/0038
(Continued)

(56) References Cited

U.S. PATENT DOCUMENTS

| 4,013,465 A | 3/1977 | Clapham et al. |
| 4,986,627 A * | 1/1991 | Boscher ................. G01M 11/31 385/140 |

(Continued)

OTHER PUBLICATIONS

Sanghera et al., "Reduced Fresnel losses in chalcogenide fibers by using anti-reflective surface structures on fiber end faces," Optics Express, 18, 25, 26760 (2010).
(Continued)

*Primary Examiner* — Bumsuk Won
*Assistant Examiner* — Jeffrey Madonna
(74) *Attorney, Agent, or Firm* — US Naval Research Laboratory; Rebecca L. Forman

(57) ABSTRACT

An optical system having two or more different optical elements with a corresponding interface between the optical elements. At least one of the optical elements has an anti-reflective structure that is transferred to the interface between two optical elements, typically by embossing. Also disclosed is the related method for making the optical system.

16 Claims, 4 Drawing Sheets

(a)

(b)

(51) Int. Cl.
  *G02B 6/255* (2006.01)
  *G02B 6/32* (2006.01)
  *G02B 6/42* (2006.01)
  *G02B 6/26* (2006.01)
(52) U.S. Cl.
  CPC ............ *G02B 6/262* (2013.01); *G02B 6/4207* (2013.01); *Y10T 29/49* (2015.01)
(58) Field of Classification Search
  USPC ...... 359/577, 590, 601–614; 385/33, 38, 39, 385/51, 95–99
  See application file for complete search history.

(56) References Cited

U.S. PATENT DOCUMENTS

| | | | |
|---|---|---|---|
| 6,208,781 B1* | 3/2001 | Neuberger | G02B 6/241 385/123 |
| 6,488,414 B1* | 12/2002 | Dawes | G02B 6/241 385/141 |
| 6,791,757 B2 | 9/2004 | Hobbs et al. | |
| 6,855,371 B2 | 2/2005 | Gier et al. | |
| 7,214,418 B2 | 5/2007 | Den et al. | |
| 7,633,045 B2 | 12/2009 | Endoh et al. | |
| 7,903,338 B1 | 3/2011 | Wach | |
| 2003/0185517 A1* | 10/2003 | Kobayashi | G02B 6/262 385/50 |
| 2006/0029321 A1* | 2/2006 | Ikarashi | G02B 6/12004 385/4 |
| 2008/0113093 A1 | 5/2008 | Hanney | |
| 2008/0193080 A1* | 8/2008 | Cheben | G02B 6/1228 385/28 |
| 2009/0136177 A1* | 5/2009 | Vayser | G02B 6/241 385/31 |
| 2010/0290118 A1* | 11/2010 | Yamada | 359/513 |
| 2011/0033156 A1* | 2/2011 | Sanghera | B29D 11/00682 385/76 |
| 2011/0069393 A1* | 3/2011 | Hamamura | G02B 1/118 359/614 |

OTHER PUBLICATIONS

Lowdermilk et al., "Graded-index antireflection surfaces for high-power laser applications," Appl. Phys. Lett., 36 (11),891 (1980).

Hobbs et al., "Design, Fabrication, and Measured Performance of Anti-Reflecting Surface Textures in Infrared Transmitting Materials," Proceedings of SPIE, 5786, 349 (2005).

Hobbs et al., "Study of the Environmental and Optical Durability of AR Microstructures in Sapphire, ALON, and Diamond," SPIE 7302, 73020J (2009).

Sechrist et al., "Utilizing Imprint Lithography With a Tri-Layer Mask to Transfer Anti-Reflection Moth Eye Strucutres Into Spinel Windows," 13th EMWS (2010).

Agarwal et al., "Application of Physical Gradient Index (Moth-Eye) Structures to ALON Windows as a Durable Anti-Reflection Treatment," SPIE 7302, 73020K1 (2009).

\* cited by examiner (a)

(b)

(a)

(b)

TAILORED INTERFACES BETWEEN OPTICAL MATERIALS

PRIORITY CLAIM

This Application claims priority from U.S. Provisional Application No. 61/541,180 filed on Sep. 30, 2011 by Jasbinder S. Sanghera et al., entitled "Tailored Interfaces between Optical Materials," the entire contents of which are incorporated herein by reference.

BACKGROUND OF THE INVENTION

Field of the Invention

The present invention relates generally to optical materials and, more specifically, to tailored interfaces between optical materials.

Description of the Prior Art

A typical optical system will transmit, reflect, refract or otherwise modify the propagation of light or its salient properties such as intensity or polarization. The optical system can be designed to handle one or multiple distinct wavelengths or a broad spectrum of light. As light passes from one optical element to another it will experience transmission loss (known also as Fresnel loss) due to the fact that optical elements have different refractive indices from each other or from the medium by which they are surrounded. The ubiquitous situation is that of the light propagation through the air (refractive index of 1) which is going through an optical element. For a typical lens made of silica glass (low refractive index of about 1.5), the light propagating through air will experience 4% loss as it enters the lens and another 4% when it exits the lens back into the air. When considering high-index materials (chalcogenide glasses, for example, with indices in the 2.4-2.8 range) the losses are much higher, around 17% at each glass-air interface.

The transmission (Fresnel) losses at an interface are typically reduced by applying index matching fluids or an anti-reflective coating on the surface of the optical element. Typically, these coatings take advantage of the interference phenomenon that occurs in thin films and therefore they can be designed to enhance the light transmission within a defined wavelength band (wherein constructive interference takes place), therefore reducing the reflection on the interface. Another approach is to build a structure on the window surface in which the refractive index can be made to vary gradually from the air to the value of the window material. These anti-reflective surface structures (ARSS) are generally periodic in nature such as to generate strong diffraction or interference effects, and consist in a collection of identical objects such as graded cones or depressions. The distances between the objects and the dimensions of the objects themselves are smaller than the wavelength of light with which they are designed to interact. If these ARSS are periodic, they are often referred to as "motheye" surface structures, otherwise they are called "random" surface structures (random ARSS). The term "motheye" is derived from the natural world; it was observed that the eye of nocturnal insects (e.g., a moth) reflected little or no light regardless of the light wavelength or the angle at which incident light struck the eye surface. The artificially-produced structures can then reduce significantly the transmission loss from an optical interface between air and a window or a refractive optical element. They are also shown to have higher resistance to damage from high-intensity laser illumination and are easier to clean. (Lowdermilk et al., "Graded-index antireflection surface for high-power laser applications," *Appl. Phys. Lett.*, 36, 891 (1980).)

Surface structures can be patterned using lithography. For example, U.S. Pat. No. 4,013,465 (1977) discloses photolithography-based methods of defining periodic ARSS on glass optical substrates in a photosensitive material and transferring that ARSS into the substrate through dry etching. U.S. Pat. No. 6,855,371 (2005) describes methods for producing a periodic ARSS by applying to the substrate a coating, embossing ARSS into the applied coating with an embossing device, and curing the coating following removal of the embossing device. U.S. Pat. No. 7,214,418 (2007) contains prior art using anodized aluminum as a mask that will transfer a random ARSS on the substrate coated with the aluminum layer. Recently, microstructuring of chalcogenide fiber ends has been demonstrated, and a method of making cables with such fiber has been proposed in U.S. Patent Application 20110033156 (2010). (Sanghera et al., "Reduced Fresnel losses in chalcogenide fibers by using anti-reflective surface structures on fiber end faces," *Opt. Expr.*, 18, 26760 (2010).)

While ARSS have been demonstrated on a variety of substrates from sapphire and ALON to ZnSe to germanium, they are all concerned with reducing the Fresnel losses at the interface between the optical element and air, which is the medium considered typically. U.S. Pat. No. 7,903,338 (2011) discloses reducing the loss in transmission from one optical element to another by means of a stack of thin film layers.

The techniques used currently to protect sensitive optics require either the addition of foreign elements (such as epoxy) or cannot provide for a direct way to reduce the reflection loss at the optical interface.

BRIEF SUMMARY OF THE INVENTION

The present invention provides an optical system having two or more different optical elements with an interface between each pair of optical elements. At least one of the optical elements has an anti-reflective structure that is transferred to the interface between two optical elements, typically by embossing. Also disclosed is the related method for making the optical system.

It is the intent of this disclosure to propose the use of surface texturing on wavelength and/or sub-wavelength scale to affect the transmission from an optical element or region (different than air) to another optical element or region (different than air). In particular, reducing interface (Fresnel) losses is considered in situations where optical elements are in contact with each other rather than simply immersed in a surrounding medium. Reducing the loss in transmission from one optical element to another is done by means of a properly designed anti-reflective interface structure (ARIS). This is of interest for example in applications where a window is needed to protect a sensitive optics such as a detector or a fiber end. This is also of interest in the case of multiple-element optics (such as polarization controllers, complex lenses, etc.).

The approach of the present invention allows interfacing optical elements without the need of index matching fluids or coatings (which are sensitive to humidity, high optical power etc.). The ARIS is easily implementable through a basic embossing-like process. This concept is novel in the infrared optics domain and extremely suited for infrared glasses (low transition temperatures).

These and other features and advantages of the invention, as well as the invention itself, will become better understood by reference to the following detailed description, appended claims, and accompanying drawings.

BRIEF DESCRIPTION OF THE DRAWINGS

FIG. 1(a) shows a general view, and FIG. 1(b) shows a detailed view.

FIG. 3(c) shows an example of a structured diamond surface.

DETAILED DESCRIPTION OF THE INVENTION

The present invention provides a novel method of affecting the optical transmission or reflection at the interface between two different materials. In particular, this method allows customization of the reflection losses through surface texturing (microstructuring) of the interface between the two materials. The present invention provides a method of protecting sensitive optics while at the same time reducing dramatically the transmission loss at the optical interface without the use of foreign material between the optical elements. It also provides a method of tailoring the surface of an optic that is supposed to be in optical contact with a material used for holding, cooling or other needs concerning that optic (for example, a disk laser surrounded by a cooling liquid layer). Since the reduction in the reflectivity is obtained by structuring directly the material interface between at least two dissimilar optical objects (such as a lens and a window or a fiber and a window), it provides greater environmental stability. Use of this method provides protection in a simple yet robust way for sensitive optics with strong ceramics or diamond layers. Embodiments of this method allow for optical performance across a very broad wavelength range.

Figure 1:
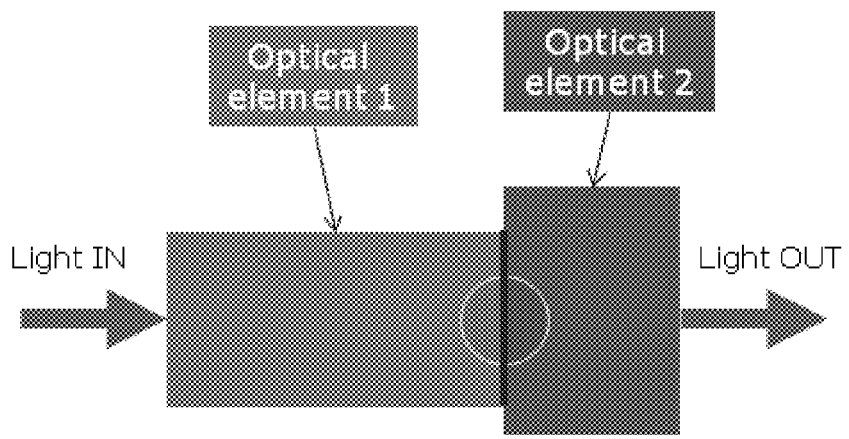
FIG. 1 is a schematic diagram of an anti-reflective interface structure between two optical elements.
Figure 1:
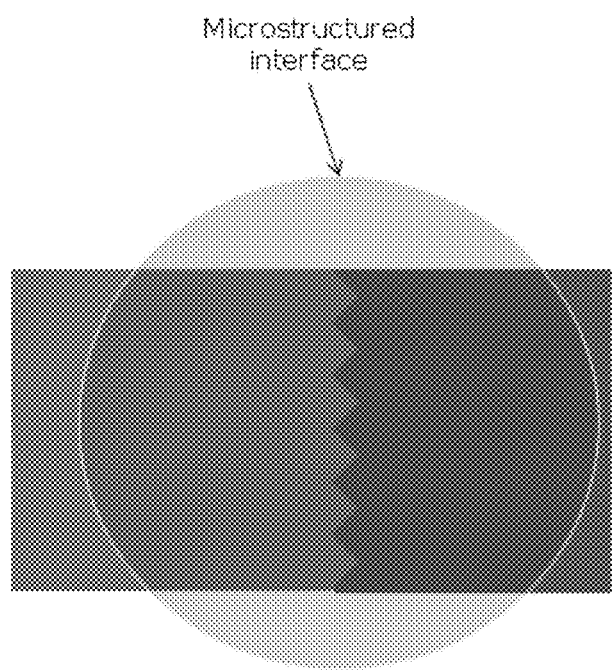

The diagram in FIG. 1 depicts one embodiment of the present invention. Optical systems with more than one element can be designed and built using suitable optical elements through embossing-like techniques. The anti-reflective interface structure (ARIS) is predefined on one of the optical elements and transferred to the interface between said elements through embossing. Design of ARIS should take into account the indices of refraction of the elements in contact.

In one embodiment, a motheye or motheye-like structure is built at the interface between an optical fiber and a strong window material. An example is a tailored interface, comprising a periodic, quasi-random or random double-dimensional array of objects, such as but not limited to graded or smooth such as cones or pits, in which the dimensions of the objects and the spacing between them are such optimized as to enhance the transmission, for example in the 2-5 μm region. This structure is built in a spinel window, for example, which is in intimate contact with an optical fiber tip, hence it is faithfully replicated into the surface of the glass fiber end, allowing for no air gap at the interface between the two materials. The fiber comprising a glass based primarily on $As_xS_y$ (with x and y typically but not needed to be x=2 and y=3) or other suitable glass for transmission in the 2-5 μm range.

Another example is a tailored interface, comprising a periodic, quasi-random or random double-dimensional array of objects, such as but not limited to graded or smooth such as cones or pits, in which the dimensions of the objects and the spacing between them are such optimized as to enhance the transmission, for example in the 8-12 μm region. This structure is built in a diamond window which is in intimate contact with an optical fiber tip, hence it is faithfully replicated into the surface of the glass fiber end, allowing for no air gap at the interface between the two materials. The fiber comprises a glass based primarily on $As_xSe_y$ (with x and y typically but not needed to be x=2 and y=3) or other suitable glass.

In another embodiment, a motheye or motheye-like structure is built at the interface between a bulk optic and a strong window material. An example is a tailored interface, comprising a periodic, quasi-random or random double-dimensional array of objects, such as but not limited to graded or smooth such as cones or pits, in which the dimensions of the objects and the spacing between them are such optimized as to enhance the transmission, for example in the 2-5 μm region. This structure is built in a diamond window which is in intimate contact with an optical lens or a prism; hence it is intimately attached or bonded to the surface of bulk optic, allowing for no air gap at the interface between the two materials. The optic material comprises a ZnSe glass or other suitable glass for transmission or light manipulation in the 8-12 μm range.

Example 1

Figure 2:
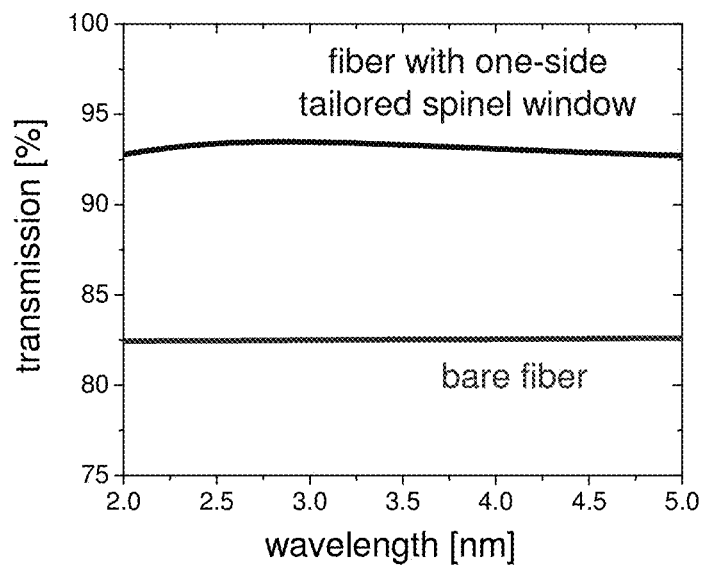
FIG. 2(a) shows the performance of a tailored interface between an $As_2S_3$ fiber and a spinel window.
FIG. 2(b) shows an example of a structured spinel surface.
Figure 2:
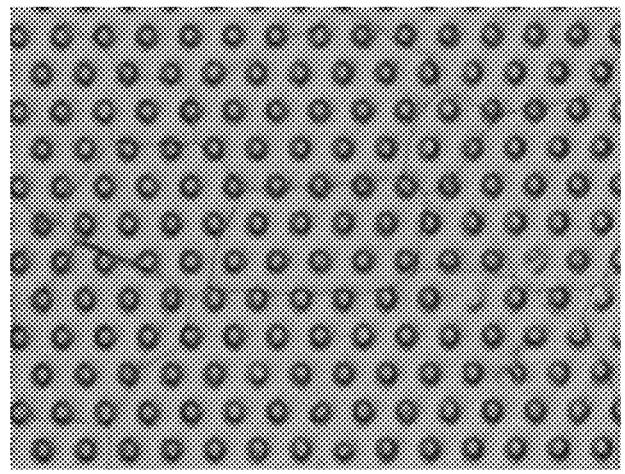

The ARIS structure can be created on flat side of a lens. A chalcogenide fiber ($As_2S_3$) is stamped into the lens and left in contact with the lens. The lens is designed to account for light divergence from the fiber. FIG. 2 shows the performance of a tailored interface between an $As_2S_3$ fiber and a spinel window in which a pattern with a period of 0.8 microns and a depth of 400 nm was already created on the spinel window surface.

Example 2

Figure 3:
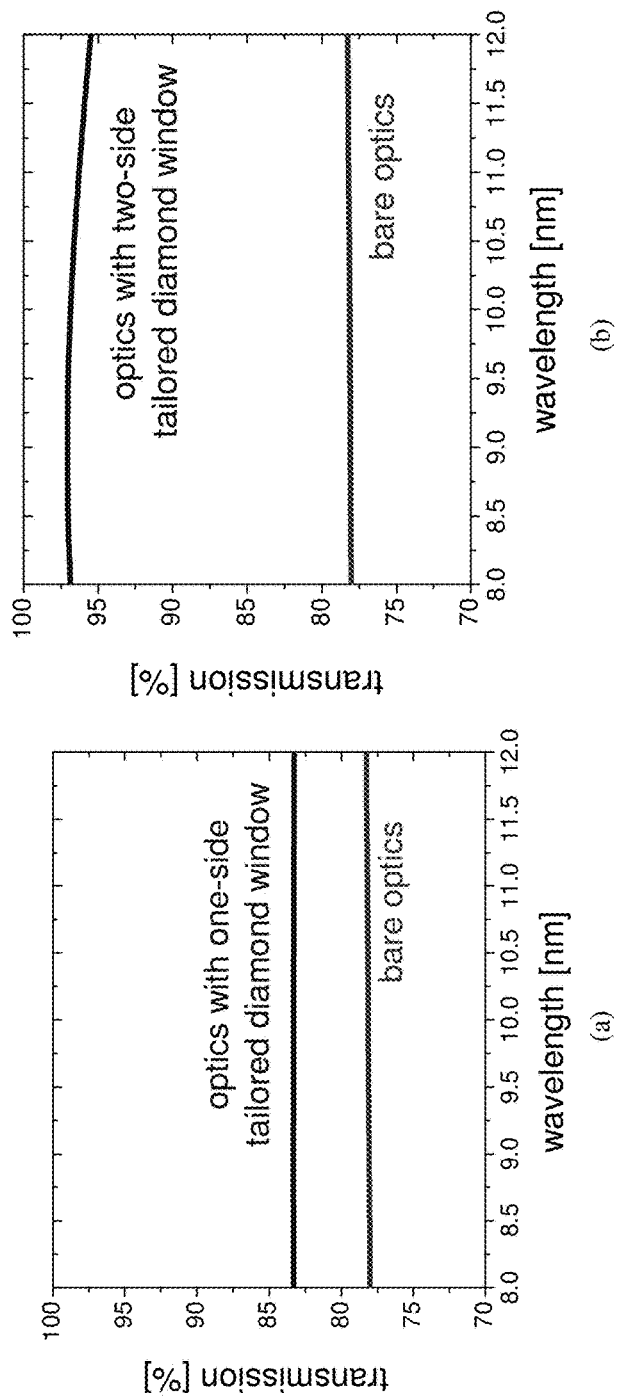
FIG. 3 shows the performance of a tailored interface between an $As_2Se_3$ optic and a diamond window with (a) one side tailored and (b) both sides tailored.

The ARIS structures can be created on both sides of a window. A chalcogenide fiber ($As_2Se_3$) was stamped into the protective window. For example, an $As_2Se_3$ optic was stamped into a diamond window in which a pattern with a period of 2.0 microns and a depth of 1.2 μm was created on the surface to be in contact with the optic. The other surface was provided with a similar structure but 2.0 μm deep, which will reduce the Fresnel reflection at the window-air interface above. FIG. 3 shows the performance of a tailored interface between an $As_2Se_3$ optic and a diamond window with (a) one side tailored and (b) both sides tailored.

Example 3

A silicon window (480 μm diameter, 340 μm thickness) was stamped on top of a multimode $As_2S_3$ fiber of 182 μm diameter. The silicon window can be microstructured to account for Fresnel losses at the chalcogenide-silicon and silicon-air interfaces.

Example 4

Figure 4:
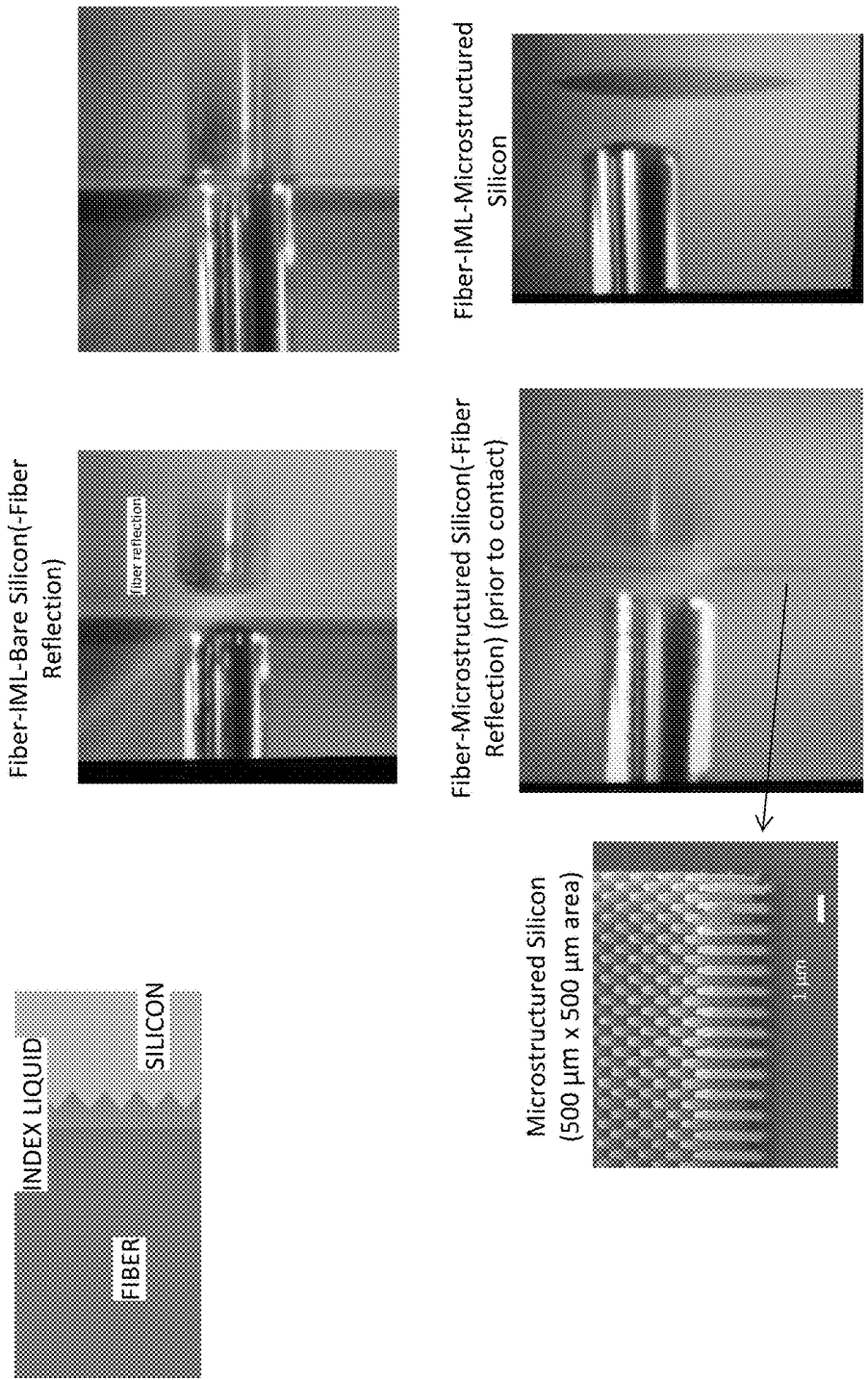
FIG. 4 shows a three-layer structure showing better light transmission when using index-matching liquid (IML) between an $As_2S_3$ fiber and a microstructured silicon window as opposed to when using IML between the fiber and a bare silicon window.

As shown in FIG. 4, a three-layer structure shows 13% better light transmission increase (measured at 1.94 μm)

when using index-matching liquid (IML) (1.690 index at 589.3 nm) between an $As_2S_3$ fiber and a microstructured silicon window (42% increase) as opposed to using IML between the fiber and a bare silicon window (26% increase) as compared to using no IML between the fiber and the bare silicon window.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. An optical system, comprising:
   a first optical element;
   a second optical element wherein the second optical element comprises a different material from the first optical element, and wherein one of the first or second optical elements comprises a chalcogenide fiber;
   an interface between the first and second optical elements; and
   an anti-reflective structure on either the first or second optical element that is transferred to the interface.

2. The optical system of claim 1, wherein there are more than two optical elements each comprising a different material from the other, wherein there is a corresponding interface between the optical elements with an anti-reflective structure transferred to each interface.

3. The optical system of claim 1, wherein the anti-reflective structure is transferred to the interface by embossing.

4. The optical system of claim 1, wherein there is an anti-reflective structure on both the first and second optical elements.

5. The optical system of claim 1, wherein the first and second optical elements are selected from the group consisting of spinel windows, diamond windows, silicon windows, optical lens, prisms, ZnSe glasses, glass fibers, fibers comprising an arsenic sulfur glass, and fibers comprising $As_2S_3$.

6. The optical system of claim 1, wherein the anti-reflective structure is a motheye structure.

7. The optical system of claim 1, wherein the anti-reflective structure comprises a periodic, quasi-random, or random double-dimensional array of objects.

8. A method for making an optical system, comprising:
   creating an anti-reflective structure on either a first or second optical element wherein the second optical element comprises a different material from the first optical element, and wherein one of the first or second optical elements comprises a chalcogenide fiber; and
   transferring the anti-reflective structure to an interface between the first and second optical elements.

9. The method of claim 8, wherein there are more than two optical elements each comprising a different material from the other, wherein there is a corresponding interface between the optical elements with an anti-reflective structure transferred to each interface.

10. The method of claim 8, wherein the anti-reflective structure is transferred to the interface by embossing.

11. The method of claim 8, wherein there is an anti-reflective structure on both the first and second optical elements.

12. The method of claim 8, wherein the first and second optical elements are selected from the group consisting of spinel windows, diamond windows, silicon windows, optical lens, prisms, ZnSe glasses, glass fibers, fibers comprising an arsenic sulfur glass, and fibers comprising $As_2S_3$.

13. The method of claim 8, wherein the anti-reflective structure is a motheye structure.

14. The method of claim 8, wherein the anti-reflective structure comprises a periodic, quasi-random, or random double-dimensional array of objects.

15. The optical system of claim 1, wherein the chalcogenide fiber comprises $As_2S_3$.

16. The method of claim 8, wherein the chalcogenide fiber comprises $As_2S_3$.

* * * * *